United States Patent [19]
Schulien et al.

[11] 3,803,924
[45] Apr. 16, 1974

[54] LIQUID HYDROSTATIC GYRO GIMBAL SUPPORT

[75] Inventors: Howard E. Schulien, Montville; William H. Ficken, Berkeley Heights; Robert J. Sgambati, Secaucus, all of N.J.

[73] Assignee: The Bendix Corporation, Teterboro, N.J.

[22] Filed: Oct. 4, 1971

[21] Appl. No.: 188,687

[52] U.S. Cl. .................................................. 74/5 R
[51] Int. Cl. .......................................... G01c 19/20
[58] Field of Search .................. 74/5 R, 5.5; 73/430

[56] References Cited
UNITED STATES PATENTS

| | | | |
|---|---|---|---|
| 3,643,516 | 2/1972 | Jacobson | 74/5 R |
| 3,515,007 | 6/1970 | Cusiter et al. | 74/5.5 |
| 3,236,108 | 2/1966 | Zatsky et al. | 74/5.5 |
| 3,657,930 | 4/1972 | Jacobson | 74/5 R |
| 3,662,609 | 5/1972 | Jacobson | 74/5.5 X |
| 3,267,744 | 8/1966 | Baldwin et al. | 74/5 R |

*Primary Examiner*—Manuel A. Antonakas
*Attorney, Agent, or Firm*—Anthony F. Cuoco; S. H. Hartz

[57] ABSTRACT

A liquid Hydrostatic Gyro Gimbal bearing system includes a pump for circulating a liquid, a bellows which allows for thermal expansion of the liquid and a sealed housing containing the gyro float and associated bearing geometry.

2 Claims, 9 Drawing Figures

INVENTORS
HOWARD E. SCHULIEN
WILLIAM H. FICKEN
ROBERT J. SGAMBATI
BY *Anthony F. Cuomo*
ATTORNEY

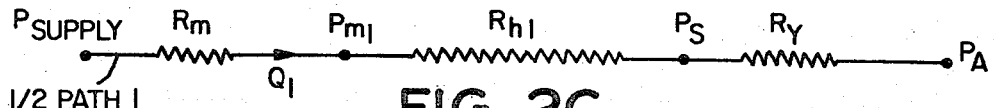
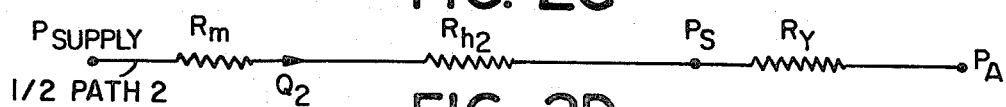
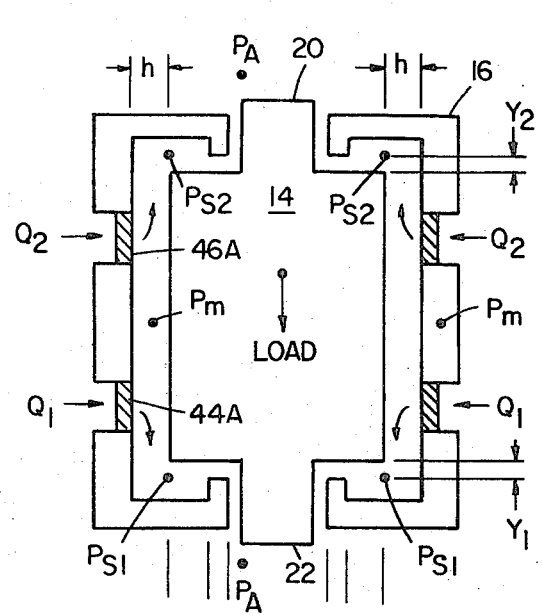
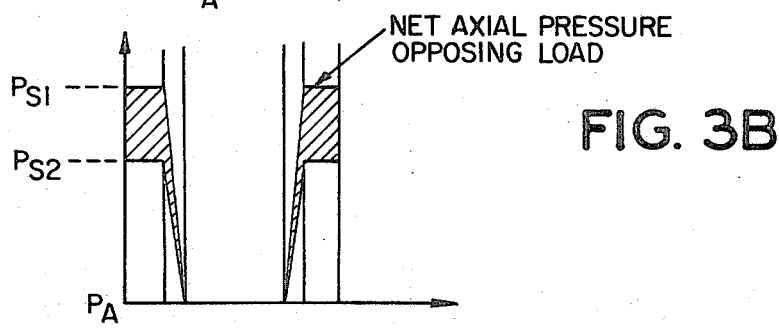
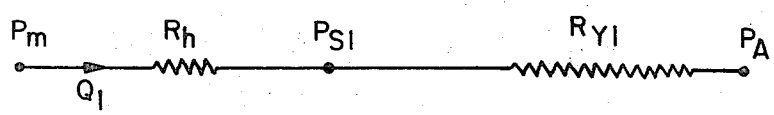
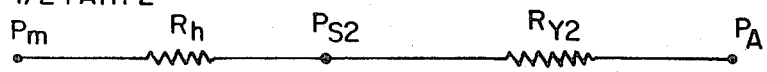

LIQUID HYDROSTATIC GYRO GIMBAL SUPPORT

BACKGROUND OF THE INVENTION

1. Field of the Invention

This invention relates generally to gyro gimbal support means and, in particular, to novel liquid hydrostatic bearing means for supporting the sensing element of a gyro.

2. Description of the Prior Art

The need exists for an inertial grade gyro which encompasses the numerous advantages found in gas bearing instruments while eliminating the necessity of an external gas supply which is prohibitive for long duration flights. Recirculating gas supply systems, while suitable from a packaging standpoint, are unacceptable due to excessive power requirements. The liquid recirculating system of the invention has lower inherent pumping power and increased damping, thermal superiority and buoyancy effect as compared with the gas bearing systems and is thus particularly suitable for the use intended.

SUMMARY OF THE INVENTION

The hydrostatic gyro bearing system of the invention contemplates a pump which circulates a working liquid, a gyro float, a bellows which allows for thermal expansion of the liquid, and a sealed housing containing the float and including a sleeve and stepped end plates which establish the bearing geometry. The liquid is pumped into the sleeve, and flows through rows of radially directed orifices, past the stepped end plates and into the bearing gaps to provide lift for the gyro float, both axially and radially. The liquid leaves the sleeve at the end plate I.D., and thereupon returns to the pump.

One object of this invention is to provide a gyro gimbal support system which includes the advantages found in gas bearing systems while eliminating the necessity of an external gas supply or an internal gas compresser requiring a prohibitive amount of power.

Another object of this invention is to provide a system of the type described which is suitable for long duration flights.

Another object of this invention is to provide a liquid hydrostatic bearing for a gyro gimbal, and which bearing has lower inherent pumping power and increased damping, thermal superiority and buoyancy as compared with bearings now known in the art.

These and other objects and features of the invention are pointed out in the following description in terms of the embodiment thereof which is shown in the accompanying drawings.

DESCRIPTION OF THE DRAWINGS

FIGS. 3A – 3D are diagrammatic representations showing the axial bearing function accomplished according to the invention.

DESCRIPTION OF THE INVENTION

Figure 1:
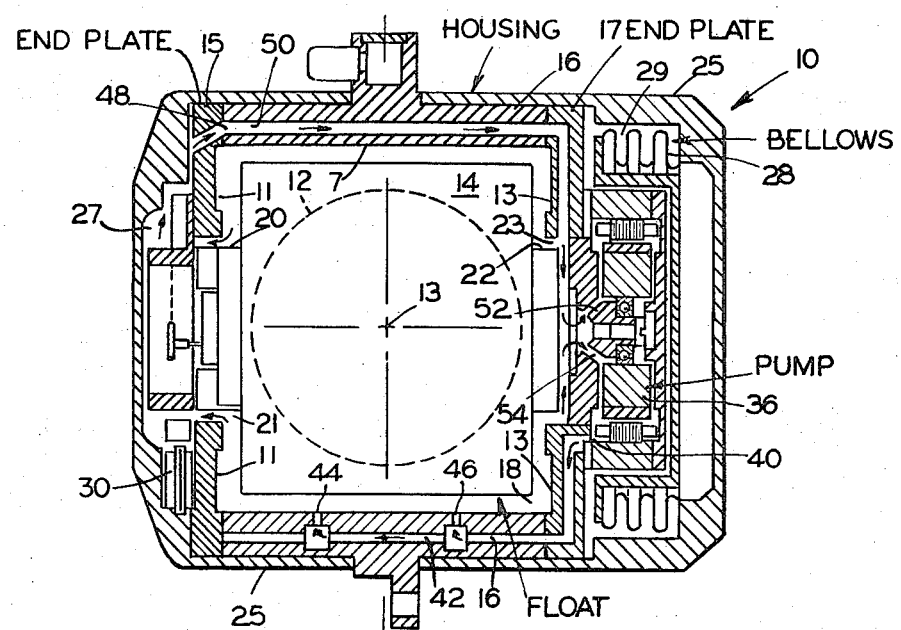
FIG. 1 is a sectional end view of a single degree-of-freedom gyro utilizing hydrostatic gimbal support means according to the invention.

Referring now to FIG. 1, reference numeral 10, indicates a single degree-of-freedom gyroscope having a rotor element 12 of conventional type and rotatably mounted about an axis 13. A cylindrical housing 16 is formed as a sleeve having end plates 15 and 17 so as to define a substantially cylindrical chamber 18 in which is mounted a gimbal element or float 14 of gyroscope 10. End plates 15 and 17 have annular steps or grooves 11 and 13, respectively.

Gimbal 14 is positioned within chamber 18 in a slightly spaced relation to side wall surfaces of housing 16 and end plates 15 and 17 defining chamber 18 so as to provide a hydrostatic bearing means for float 14 as will be hereinafter more fully described.

Float 14 further includes at opposite end portions thereof axially projecting cylindrical shaft protions 20 and 22 having surfaces positioned in spaced relation to surfaces defining recesses 21 and 23 formed at end plates 15 and 17 of housing 16.

A casing 25 encloses housing 16 and has at one end a chamber 29 having an expansion bellows 28 mounted therein to accommodate thermal expansion of the liquid. Mounted in chamber 29 in spaced relation to bellows 28 is a compact pump 36. Pump 36 is shown to be of the spiral groove viscous shear type, but may be replaced by any other type pump which meets the size, output, power consumption, lift requirements and other characteristics of the application described.

An opposite end chamber 27 of casing 25 has mounted therein a suitable electronic pick-off device indicated generally by the numeral 30, and having a rotor element operably connected to shaft portion 20 of gimbal 14. Electronic pick-off device 30 is electrically connected so as to provide electrical signals in a conventional manner indicative of the angular position of float 14.

Pump 36 includes an outlet port 40 which leads to a longitudinally extending fluid pressure channel 42 provided in housing 16. Fluid pressure channel 42 in turn opens at ports 44 and 46 into cylindrical space 18. Liquid flows through space 18 into bearing recesses 21 and 23; flows from recess 23 into pump inlet ports 52 and 54; from recess 21 through a port 48 leading to a longitudinally extending channel 50 in housing 16; and through the I.D. of end plate 17 to pump inlet ports 52 and 54. The direction of liquid flow is indicated by arrows in FIG. 1.

Figure 2A:
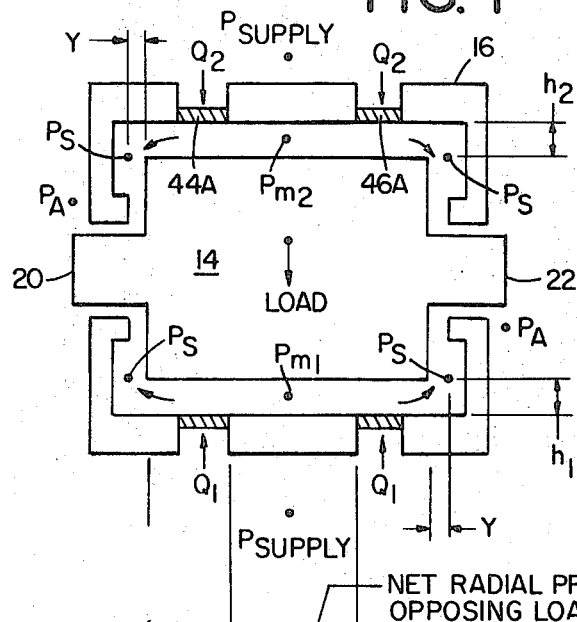
FIGS. 2A – 2B are diagrammatic representations showing the axial bearing function accomplished according to the invention.

Thus, the liquid circulated by pump 36 provides both axial and radial lift for gyro float 14. Radial bearing is accomplished as shown in FIG. 2 wherein $P_A$ equals ambient pressure, $P_s$ equals step pressure; $P_m$ equals manifold pressure, h equals radial gap, Q equals liquid volume flow rate; $R_m$ equals the resistance of millipore filters 44A and 46A restricting the flow of liquid through ports 44 and 46; $R_h$ equals radial gap flow resistance, Y equals the axial gap and $R_y$ equals axial gap flow resistance.

Figure 2B:
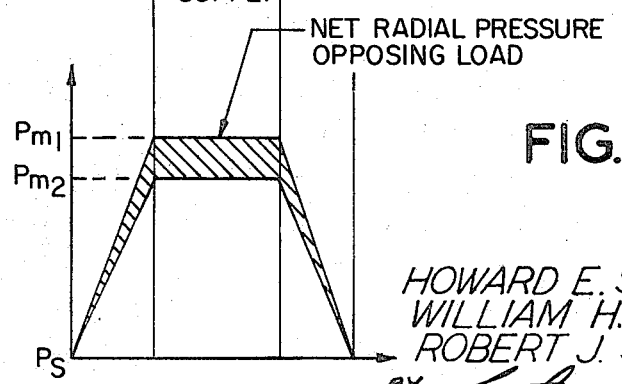

As the load is applied, float 16 is deflected downward increasing radial gap $h_2$ and decreasing radial gap $h_1$. The laminar flow through the upper millipore filters is increased while the flow through the lower filters is decreased. As shown in FIG. 2B, this results in an increase in the lower manifold pressure ($P_{m1}$) and a decrease in the upper manifold pressure ($P_{m2}$) producing a net upward thrust opposing the applied load.

A liquid flow analogy, using equivalent resistances, as shown in FIGS. 2C and 2D may be made as follows:

$$h_2 > h_1 \tag{1}$$

$$R_h = f[1/h^3] \tag{2}$$

$$R_h > R_h \tag{3}$$

$$Q_1 > Q_2 \tag{4}$$

$$P_m = P_s - QR_m \tag{5}$$

therefore:

$P_m > P_m$, and net radial thrust is developed.

The axial bearing function is shown schematically in FIG. 3A, wherein $P_A$ = ambient pressure, $P_s$ = step pressure, $R_m$ = millipore filter flow resistance, $Q$ = liquid volume flow rate, $R_h$ = radial gap flow resistance, $R_y$ = axial gap flow resistance, $Y$ = axial gap and $h$ = radial gap.

As the load is applied $Y_2$ becomes larger than $Y_1$ causing an increase in $Q_2$ and a decrease in $Q_1$. Both $Q_1$ and $Q_2$ flow through equal radial gaps assuming zero radial load and zero radial eccentricity. Thus, $P_{s1}$ becomes larger than $P_{s2}$, and a net thrust opposing the applied load is provided as shown in FIG. 3B.

Flow analogy may be using equivalent resistances as shown in FIGS. 3C, 3D as follows:

$$Y_2 > Y_1 \tag{6}$$

$$R_y = f[1/y^3] \tag{7}$$

$$R_Y > R_y \tag{8}$$

$$Q_1 < Q_2 \tag{9}$$

$$P_s = P_m - QR_y \tag{10}$$

Therefore: $P_{s1} > P_{s2}$, and net thrust is developed.

It will now be understood that the operation of the device of the invention has been described for a single degree-of-freedom gyro which has a cylindrical float but can also be applied to a two degree-of-freedom gyro.

It will be further understood that the liquid medium used for the hydrostatic bearing of the invention may be a material such as trichlorotrifluorethene commercially available as freon 113 or freon TF.

While one embodiment of the invention has been illustrated and described, various changes in the form and relative arrangement of the parts, which will now appear obvious to those skilled in the art may be made without departing from the spirt and scope of the invention.

What is claimed is:

1. A gyro including a liquid hydrostatic bearing system, comprising:

A sleeve and a pair of opposite end plates having annular grooves and surfaces defining recesses, said sleeve and end plates arranged to provide a substantially cylindrical chamber;

a float disposed within the chamber in slightly spaced relation to the sleeve and end plates and including shaft members at opposite ends thereof disposed in spaced relation to the corresponding recesses defined by the end plate surfaces, said space between the chamber and float and shaft members and recesses being both axial and radial;

said chamber including at least two longitudinally extending channels and radial disposed ports at opposite ends of the float connecting one of said channels with the space;

a casing surrounding the chamber and including opposite end sections;

a pump mounted in one of the end sections and including outlet ports open to the one channel and inlet ports open to the other channel;

a port connecting the space and the other channels:

the pump being effective for pumping a liquid from the pump outlet ports through the connecting ports, channel and space to the pump inlet ports to provide axial and radial lift for the float;

the float being deflected in one sense to increase the radial space in the one sense and to decrease the radial space in the opposite sense upon application of a load;

laminar liquid flow through the ports being thereupon increased in the one sense and decreased in the opposite sense;

filter means for restricting liquid flow through the radial ports; and a net radial pressure in the one sense for opposing the applied load being applied in accordance with the equation:

$$P_m = P_s - QR_m,$$

where $P_m$ is the net radial pressure, $P_s$ is the pressure on the annular grooves, $Q$ is liquid volume flow rate and $R_m$ is the filter flow resistance.

2. A system as described by claim 1, wherein the float is deflected in one sense to increase the axial space in the one sense and to decrease the axial space in the opposite sense upon application of the load;

laminar liquid flow through the port at the end of the float near the increased axial space being increased and flow through the port at the end of the float near the decreased axial space being decreased; and a net axial pressure on the annular groove in the one sense for opposing the applied load being applied in accordance with the equation:

$P_s = P_m - QR_y$, where $P_s$ is the net annular groove pressure, $P_m$ is the net radial pressure opposing the applied load, $Q$ is liquid volume flow rate and $R_y$ is axial space flow resistance.

* * * * *